United States Patent
Etoh

[11] Patent Number: 5,929,913
[45] Date of Patent: Jul. 27, 1999

[54] MOTION VECTOR DETECTOR AND VIDEO CODER

[75] Inventor: Minoru Etoh, Katano, Japan

[73] Assignee: Matsushita Electrical Industrial Co., Ltd, Osaka, Japan

[21] Appl. No.: 08/904,619

[22] Filed: Aug. 1, 1997

Related U.S. Application Data

[62] Division of application No. 08/871,688, Jun. 9, 1997, which is a continuation of application No. 08/329,276, Oct. 26, 1994, abandoned.

[30] Foreign Application Priority Data

Oct. 28, 1993 [JP] Japan .................................. 5-270836

[51] Int. Cl.$^6$ ........................................................ H04N 7/32
[52] U.S. Cl. ........................ 348/398; 348/409; 348/699
[58] Field of Search .................................... 348/384, 390, 348/396–398, 400–402, 407, 409–413, 415, 416, 699; 382/232, 236, 238, 240, 248, 250; H04N 7/130, 7/137, 7/132

[56] References Cited

U.S. PATENT DOCUMENTS

| | | |
|---|---|---|
| 4,691,230 | 9/1987 | Kaneko et al. . |
| 4,851,906 | 7/1989 | Koga et al. . |
| 4,989,089 | 1/1991 | Chantelou et al. . |
| 5,036,393 | 7/1991 | Samad et al. . |

(List continued on next page.)

FOREIGN PATENT DOCUMENTS

| | | |
|---|---|---|
| 62-105587 | 5/1987 | Japan . |
| 62-230180 | 10/1987 | Japan . |
| 4-287588 | 10/1992 | Japan . |
| 5-199515 | 8/1993 | Japan . |

OTHER PUBLICATIONS

K. Fukinuke, Chapter 10 in "Image digital signal processing", (Nikkan Kogyo Shimbun, 1985) (no translation).

CCITT Recommendation H.261, entitled "Description of Ref. Model 8 (RM8)", version of Jun. 9, 1989.

M. Kawashima et al., "A Study on Very Low Bit–rate Video Coding" (Technical Report of Institute of Electronic Information and Communications Engineers of Japan, IE92–117, Feb. 1993) (Abstract translated).

(List continued on next page.)

*Primary Examiner*—Richard Lee
*Attorney, Agent, or Firm*—Smith, Gambrell & Russell, LLP; Beveridge, DeGrandi, Weilacher & Young; Intellectual Property Group

[57] ABSTRACT

By a motion vector correction circuit 313, a motion vector minimizing the sum of a value of the quadratic error function having a motion vector as a variable and the motion vector changing amount in neighboring blocks is determined, and it is linearly interpolated by a motion vector interpolation circuit 314 to obtain a motion vector in a pixel unit, and a motion compensated picture is generated, and a differential picture of the current frame and this motion compensated picture is divided into sub-bands by a video transform circuit 304, and only the information in the region of the larger differential signal energy is coded.

2 Claims, 14 Drawing Sheets

U.S. PATENT DOCUMENTS

| | | |
|---|---|---|
| 5,070,403 | 12/1991 | Wilkinson . |
| 5,105,271 | 4/1992 | Niihara . |
| 5,204,740 | 4/1993 | Ishii . |
| 5,206,723 | 4/1993 | Parke . |
| 5,220,422 | 6/1993 | Oh .......................................... 348/398 |
| 5,278,915 | 1/1994 | Chupeau et al. . |
| 5,280,350 | 1/1994 | DeHaan et al. . |
| 5,317,397 | 5/1994 | Odaka et al. . |
| 5,337,085 | 8/1994 | Lee et al. . |
| 5,430,487 | 7/1995 | Naimpally . |
| 5,459,514 | 10/1995 | Sakamoto et al. ...................... 348/398 |
| 5,473,441 | 12/1995 | Inuiya et al. . |
| 5,600,374 | 2/1997 | Shikakura ............................... 348/398 |
| 5,604,602 | 2/1997 | Guillotel et al. ........................ 348/398 |
| 5,633,684 | 5/1997 | Teranishi et al. ....................... 348/398 |

OTHER PUBLICATIONS

D. Le Gall, A. Tabatani, "Sub–band Coding of Digital Images Using Symmetric Short Kernel Filters and Arithmetic Coding Techniques," Proc. IEEE Int. Conf. Acoustic Speech Signal Processing, pp. 761–764, Apr. 1988.

Ohta, et al., "Wavelet Picture Coding With Transform Coding Approach", (*IEICE Trans. Fundamentals*), Jul. 1992, vol. E75–A, No. 7, pp. 776–785.

Campbell, "Very Low Bitrate Video Coder Using Warping Prediction", *NEC Corp. Signal Processing Lab.*, Oct. 4–6, 1993, pp. 167–168.

Anandan, "A Computational Framework and an Algorithm for the Measurement of Visual Motion", *International Journal of Computer Vision*, 2, 1989, pp. 283–310.

Sullivan, et al. "Motion Compensation for Video Compression Using Control Grid Interpolation", *IEEE*, 1991, pp. 2713–2717.

Etoh et al, "Template–Based Video Coding with Opacity Representation", IEEE Transactions on Circuits and Systems for Video Technology, vol. 7, No. 1, pp. 172–180 Feb. 1997.

MOTION VECTOR DETECTOR AND VIDEO CODER

This is a divisional of co-pending application Ser. No. 08/871,688 filed on Jun. 9, 1997 which is a continuation application of Ser. No. 08/329,276 filed on Oct. 26, 1994 (now abandoned).

BACKGROUND OF THE INVENTION

1. Field of the Invention

The present invention relates to a motion vector detector used in coding of image and reduction of noise, and a video coder for transmitting and accumulating images in a small coding quantity.

2. Related Art of the Invention

A conventional technique for detection of motion vector is described, for example, by K. FUKINUKE in "Image digital signal processing" (chapter 10, NIKKAN KOGYO SHIMBUN, 1985). Herein, the "method of minimizing the difference between consecutive images" is to determine the motion vector as the shift (a, b) for minimizing formula 1, where $g_t(x,y)$ denotes the luminance at screen position (x,y) in frame t, and R represents a block region on the screen.

$$\sum_{(x,y)\in R} |g_{t-1}(x+a, y+b) - g_t(x, y)| \qquad \text{formula [1]}$$

This principle is shown in FIG. 9. The motion vector is determined as the shift (a,b) to block R' having the closest correlation with block R, in the image of frame of time t-1. In formula 1, the sum of absolute values is determined as the evaluation of correlation, but the sum of squared errors may be also used. Such "method for minimizing the difference of consecutive images" is herein called the block correlation method.

The block may not be necessarily square. For detection of motion vector by block correlation method, the following problems exist.

(A1) When the block region is set smaller, the reliability of detected motion vector is lowered due to disturbance of the noise component. To the contrary, when the region is larger, the detection precision is higher, but the granularity of motion vector detection becomes coarse.

(A2) If there is no luminance change component differing in direction in the region defined by the block, the correspondence of region on the frame is not determined.

To solve these problems, several improvements of block correlation method had been attempted. For example, as prior art for solving the problem (A1), a motion vector detecting method (prior art 1) was disclosed in the Japanese Laid-Open Patent No. 62-230180. This is a method of setting wider so that mutual blocks may overlap, instead of equally dividing the image to form blocks as the basic unit corresponding to a region between frames. According to this method, if the interval of motion vector detection is narrow, the block for calculating the correlation is greater than the interval of motion vector detection, and therefore the motion vector may be stably estimated from the block correlation equally divided by the interval of motion vector detection.

As prior art for solving the problem (A2), for example, a motion vector detector (prior art 2) was disclosed in the Japanese Laid-Open Patent 62-105587. In this apparatus, by determining the variance of luminance values in the block, it is evaluated whether the block for calculating the correlation is valid for motion vector detection or not. If the variance of luminance in the block is small, the use of a motion vector low in reliability can be avoided as an invalid vector not determined in the correspondence of a region on different frames. Two prior arts of motion vector detecting method or apparatus have been introduced.

Next is shown prior art of video coder. For example, a video coder (prior art 3) is mentioned in CCITT Recommendation H.261. In the inter-frame coding mode of this coder, when coding the present frame image, a predicted image of the current frame is produced as a motion compensated image from the image of the preceding frame by the block correlation method, and the differential image between the motion compensated image and current frame image is coded. In this coder, while the motion compensated image is matched with the preceding frame without error, the information to be sent is only the motion vector, so that the image can be transmitted by a small coding amount.

Incidentally, the H.261 is a specification of a video coder recommended for the purpose of transmitting an image of at least 144×180 pixels at a coding rate of 64 kilobits per second or faster. If an image of similar size is coded at about 20 kilobits per second (hereinafter called very low bit rate coding), the following problems are experienced.

(B1) A motion compensated image is created by using parallel move in a block unit determined by the detected motion vector. Generally, hence, the motion compensated image is discontinuous on the block border. If the coding amount that can be transmitted is enough, this block border is not recognized as it is transmitted as the differential information between the motion compensated image and current frame image. If the coding amount is limited, however, it is recognized as a visual disturbance.

(B2) In the video coder conforming to the H.261, high efficiency coding is realized by a discrete cosine transform of the image in every block and coarse quantization of high frequency components. In a limited coding amount, however, a quantizing error of a DC component in each block is recognized as the block border and becomes a visual disturbance.

As prior art for solving the problem (B1), for example, an image coding method (prior art 4) was proposed by M. KAWASHINA et al. in "Ultralow bit rate coding of motion picture" (Technical Report of Institute of Electronic Information and Communications Engineers of Japan, EI92-117, February 1993). This is a method for creating a motion compensated image by determining the motion amount of each pixel by interpolation of the transmitted motion vector. According to this method, a smooth motion compensated image is obtained by a small number of motion vectors.

As a prior art for solving the problem (B2), for example, a sub-band coding method (prior art 5) was disclosed in the Japanese Laid-Open Patent No. 62-230180. In the sub-band coding method, the picture is divided into different frequency bands by filter scanning. In the former prior arts, the sub-banded image, or the image composed of different frequency bands can be coded with high efficiency, by scanning the sample point at the same spatial position from the low frequency to the high frequency region. In this sub-band coding method, by contrast, since luminance information produced from the frequency components of the image are overlapped, the quantizing error of the low frequency components is not recognized as the block border to cause a visual disturbance.

In spite of the prior art, however, the following problems exist.

(C1) In prior art 1 and prior art 2, the motion vector is not determined by making use of a correlation of adjacent blocks. In prior art 1, it is possible that a motion vector largely different from an adjoining block may be detected. In prior art 2, if desired to determine the motion vector of an invalid block, there is no other method than to determine by interpolation of the motion vector obtained in the adjoining block.

(C2) In very low bit rate coding, it is necessary to decrease not only the coding amount of differential image, but also the coding amount of motion vector. In the video coder conforming to the H.261 as prior art 3, the coding amount is kept low by Hafman coding of the difference from the adjoining motion vector. However, the correlation of motion vectors used in coding is in one dimension and one direction only, and a more efficient motion vector coding is demanded in very low bit rate coding.

(C3) In prior art 4, in the first place, the motion vector is determined by block correlation method, and the motion vector in pixel unit is determined by a luminance gradient, then the representative motion vector is corrected and determined so that the differential signal power between frames may be a minimum. In this prior art, the motion vector in a pixel unit can be determined by interpolating few representative motion vectors, but the disclosed technique is complicated.

(C4) Even by employing the coding method of prior art 5, if attempted to perform very low bit rate coding by sub-band division, it is necessary to quantize the sub-band divided images coarsely. As a result of decoding by synthesizing coarsely quantized frequency components, ringing is recognized as a visual disturbance.

SUMMARY OF THE INVENTION

It is hence a primary objective of this invention to provide, in consideration of such problems in conventional motion vector detection and image coding, a motion vector detector and a video coder capable of obtaining a smooth motion vector if the block size is small, avoiding block distortion in a motion compensated image, suppressing at a low motion vector coding amount, and dividing into sub-bands with little ringing.

A first motion vector detector of the present invention comprises:
 a memory for holding a coded image,
 error arithmetic means for reading out frame images before and after in time from the memory, in plural partial regions obtained by dividing the image, calculating error between the partial regions of the different frame images, and determining a shift between the partial regions of a minimum error and an error value in a vicinity of the shift,
 error function arithmetic means for determining an error function from the error value, and
 optimizing means for determining a shift for minimizing a sum of changes of the shift in adjacent partial regions and a value of the error function.

A second motion vector detector of the present invention comprises:
 a memory for holding a coded image,
 shift storage means for storing a shift between corresponding partial regions in the frame images before and after in time, in plural partial regions obtained by dividing the image,
 minimum shift direction arithmetic means for reading the frame images from the memory, and determining a direction, near the shift stored in the shift storage means, where a sum of and an error between partial regions of the different frame images and change of the shift of the adjacent partial regions may be minimum, and
 correcting means for varying the shift stored in the shift storage means, to the minimum shift direction obtained in the minimum shift direction arithmetic means,
 wherein the shift storage means produces the shift stored when the minimum shift direction arithmetic means and correcting means are repeatedly operated plural times, as motion vector.

A third motion vector detector of the present invention comprises:
 the first motion vector detector of discussed above, and
 motion vector interpolating means for interpolating plural motion vectors obtained by the motion vector detector, thereby to obtain a motion vector of each pixel.

A fourth motion vector detector of the present invention comprises:
 the second motion vector detector of discussed above, and
 motion vector interpolating means for interpolating plural motion vectors obtained by the motion vector detector, thereby to obtain a motion vector of each pixel.

A first video coder of the present invention comprises:
 band dividing means for dividing an image into plural frequency band components,
 changing region detecting means for detecting a region of which luminance change is larger than a specified value in the image, and
 window coefficient multiplying means for multiplying each frequency band component of the image divided by the band dividing means, by a non-zero window coefficient in a region detected by the changing region detecting means, and by a zero window coefficient in other regions.

A second video coder of the present invention comprises:
 band dividing means for dividing an image into plural frequency band components,
 changing region detecting means for detecting a region of which luminance change is larger than a specified value in the image,
 region information coding means for transmitting a position information of the region detected by the changing region detecting means, and
 band component coding means for transmitting only each frequency band component of the image divided by the band dividing means in the region detected by the changing region detecting means.

A third video coder of the present invention comprises:
 motion vector converting means for receiving motion vectors of plural partial regions obtained by dividing an image, and converting adjacent plural motion vectors into their representative value and differential value, and
 motion vector coding means for coding the representative value and the differential value side by side.

A first video decoder of the present invention comprises:
 band combining means for combining frequency band components inputted from said second video coder discussed above to obtain an original wave,
 region information decoding means for decoding position information of a transmitted partial region, thereby to decode only original wave of the partial region defined by said position information.

A second video decoder of the present invention comprises:

decoding means for decoding the representative value and differential value obtained by said third video coder discussed above, and motion vector reversing means for re-constituting the decoded representative value and differential value or plural motion vectors of partial region.

In the first motion vector detector, the error arithmetic means calculates the error between partial regions of frame images before and after in time, and determines the shift between the partial regions having the minimum error and the error value near the shift, then after receiving this result, the error function arithmetic means determines an error function from the error value, and consequently the optimizing means determines the motion vector so that the sum of this error function and the change of the shift in the adjoining partial region may be minimum. As a result, the motion vector is determined so as to correspond to the partial region of the current frame and the partial region of the preceding frame without significant error, and to vary smoothly in space.

In the second motion vector detector, the minimum shift direction arithmetic means determines the direction of the minimum sum of the error of partial regions of different frame images and change of shift of adjoining regions, and the correcting means, receiving this result, corrects the shift stored in the shift storage means. This correction of shift is repeated. As a result, a motion vector is determined so as to be small in the error between partial regions of different frames corresponding to each other at a shift produced as a motion vector, and to be smooth in the obtained motion vector.

According to these two inventions, as far as a motion vector is obtained stably in a certain partial region, if the adjoining region is a region of small luminance change, the motion vector can be estimated more stably, so that it is effective to solve the problem (C1).

In the third and fourth motion vector detectors, using the first or second motion vector detectors, the motion vector can be obtained smoothly between partial regions. By making use of this nature, the motion vector interpolating means interpolates the motion vector of plural partial regions, and determines the motion vector of each pixel (in the block correlation method without using the first or second motion vector detector, it is not guaranteed that the obtained motion vector is smooth in space, and hence it is hard to determine the motion vector of each pixel by interpolation).

In the first video coder invention, the image is divided into plural frequency band components by the band dividing means, a region with a large changing amount of luminance is detected by the changing region detecting means, and the frequency component of this region is multiplied by a non-zero window coefficient, and the other regions, by a zero window coefficient by the window coefficient multiplying means. As a result, only the information in the region with the large luminance change amount is transmitted (in the conventional sub-band coding, all divided frequency components are scanned and transmitted), and thereby the information transmission in the region with the small luminance change amount is suppressed. For the problem (C4), by concentrating the coding amount into a certain selected partial region, an image coding with less ringing is realized.

In the second video coder invention, for the problem (C4), in sub-band coding, a region of large luminance change amount is detected by the changing region detecting means, and the position information of that region is transmitted by the region information coding means, and, corresponding to this, the band component coding means codes only the frequency component of the detected region. By concentrating the coding amount into a certain selected partial region, an image coding with less ringing is realized. As compared with the first video coder invention, it gives rise newly to the need to transmit the selected partial region information, but for the frequency component, to the contrary, it is enough to transmit only for the corresponding region.

In the third video coder, the motion vector converting means converts adjacent plural motion vectors into their representative value and differential value, the motion vector coding means codes the representative value and differential value side by side, by making use of the redundancy that the differential value is very often zero because the motion vector is continuous or uniform in most regions of image. Consequently, the motion vector can be coded by a small quantity of information.

In the first video decoder invention, the band combining means combines frequency band components inputted from said second video coder, to obtain the original wave, and the region information decoding means decodes position information of a transmitted partial region, thereby to decode only original wave of the partial region defined by said position information.

In the second video decoder invention, the decoding means decodes the representative value and differential value obtained by said third video coder, and the motion vector reversing means re-constitutes the decoded representative value and differential value or plural motion vectors of partial region.

PREFERRED EMBODIMENTS

Figure 1:
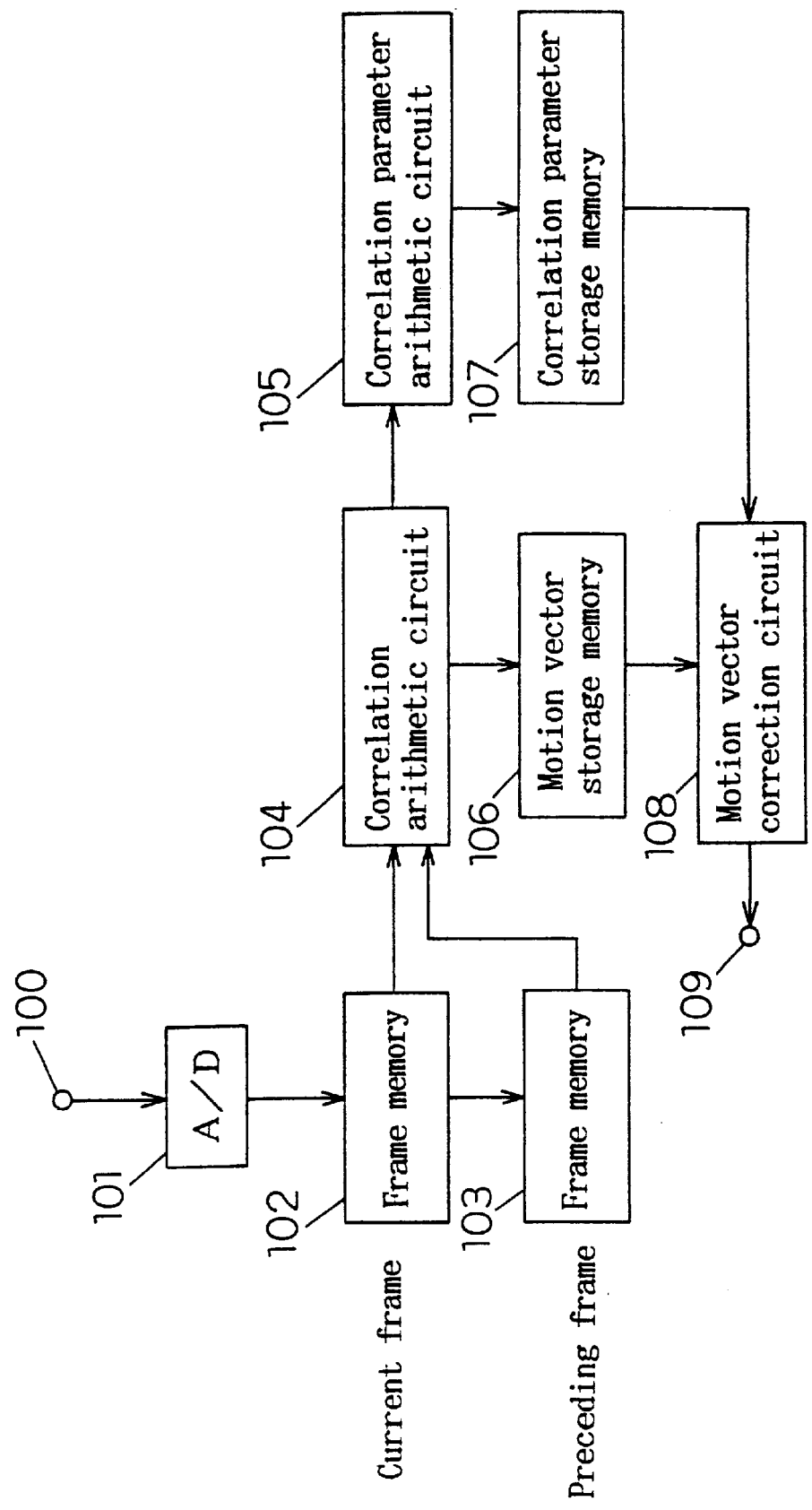
FIG. 1 is a block diagram of a motion vector detector in a first embodiment of the invention.

Referring now to the drawings, some of the embodiments of the invention are described in detail below.

In the embodiments shown in the specification, for the ease of understanding of the operation of the apparatus shown in the embodiment, the image is composed of 144×176 pixels, and the block for correlation operation is composed of 8 pixels by 8 pixels.

Figure 9:
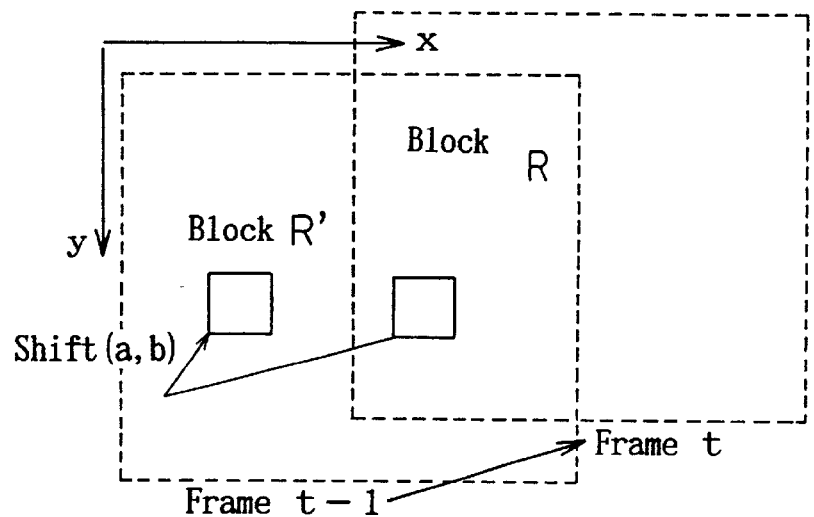
FIG. 9 is a diagram for explaining the principle of block correlation method.
Figure 10:
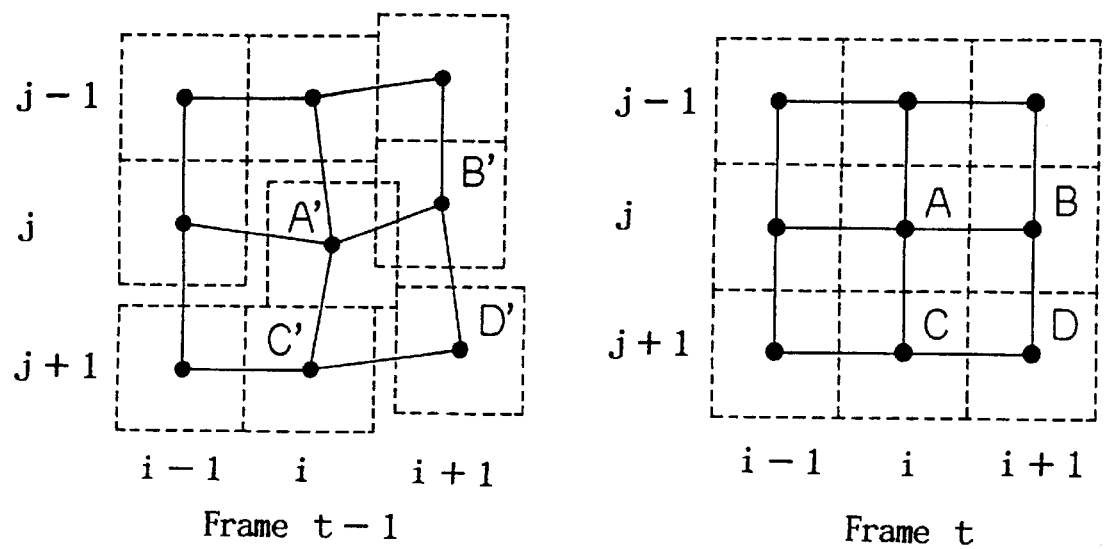
FIG. 10 is a diagram for explaining the operation of block correlation processing.

FIG. 1 is a block diagram of a motion vector detector in a first embodiment of the invention. FIG. 9 and FIG. 10 are diagrams for explaining the block correlation processing. In FIG. 1, reference numeral 100 is a video input terminal, 101 is an A/D converting circuit for quantizing a video analog signal, 102, 103 are frame memories for storing preceding and succeeding frames of the picture, 104 is a correlation arithmetic circuit for block correlation calculation, 105 is a correlation parameter arithmetic circuit for calculating the correlation parameter from the result of block correlation calculation, 106 is a motion vector storage memory, 107 is a correlation parameter storage memory, 108 is a motion vector correcting circuit for correcting the motion vector by correlation parameter, and 109 is a motion vector output terminal. The frame memories 102, 103 compose a memory, the correlation arithmetic circuit 104 composes error arithmetic means, the correlation parameter arithmetic circuit 105 composes error function arithmetic means, and the motion vector correcting circuit 108 composes optimizing means. This embodiment relates to a motion vector detector for detecting a parallel move component as a motion vector in a block divided into 18×22.

In thus constituted first embodiment, the processing procedure is described below.

First, the image of the preceding frame digitized by the A/D converting circuit 101 is stored in the frame memory 103, and the image of the current frame is stored in the frame memory 102. The correlation arithmetic circuit 104 reads out block information R from the current frame memory 102 as shown in FIG. 9, and simultaneously reads out block information R' of the preceding frame, while varying the shift (u,v) in every pixel, thereby calculating the correlation as shown in formula 2. In formula 2, $g_t(x,y)$ denotes the luminance value of frame t at pixel position (x,y). Consequently, the shift for minimizing the value is searched as shown in formula 3, and a primary estimation (a,b) is obtained. This (a,b) value is obtained at a precision of one pixel.

$$E(u, v) = \sum_{(x,y) \in R} (g_{t-1}(x+u, y+v) - g_t(x, y))^2 \qquad \text{formula [2]}$$

$$(a, b) = \arg\min_{(u,v)} E(u, v) \qquad \text{formula [3]}$$

This calculation is performed on each block divided into 18×22 pieces, and the results are stored in the motion vector storage memory 106. In the process of determining the minimum shift in each block, an array S of squared errors near the minimum shift shown in formula 4 is calculated, where $(\ )^t$ denotes the transposition of matrix. The correlation arithmetic circuit 104 sends it out into the correlation parameter arithmetic circuit 105.

$$S=(E(a-1,b-1),E(a-1,b),E(a-1,b+1),E(a,b-1), E(a,b),E(a,b+1),$$
$$E(a+1,b-1),E(a+1,b),E(a+1,b+1))^t \qquad \text{formula [4]}$$

The correlation parameter arithmetic circuit 105 calculates the correlation parameters shown in formulas 5 through 10.

$$\bar{E}(a, b) = \frac{1}{9}(-1, 2, -1, 2, 5, 2, -1, 2, -1)S \qquad \text{formula [5]}$$

$$\left.\frac{\partial E(u,v)}{\partial u}\right|_{(u,v)=(a,b)} = \frac{1}{6}(-1, 0, 1, -1, 0, 1, -1, 0, 1)S \qquad \text{formula [6]}$$

$$\left.\frac{\partial E(u,v)}{\partial v}\right|_{(u,v)=(a,b)} = \frac{1}{6}(-1, -1, -1, 0, 0, 0, 1, 1, 1)S \qquad \text{formula [7]}$$

$$\left.\frac{\partial^2 E(u,v)}{\partial u^2}\right|_{(u,v)=(a,b)} = \frac{1}{3}(1, -2, 1, 1, -2, 1, 1, -2, 1)S \qquad \text{formula [8]}$$

$$\left.\frac{\partial^2 E(u,v)}{\partial v^2}\right|_{(u,v)=(a,b)} = \frac{1}{3}(1, 1, 1, -2, -2, -2, 1, 1, 1)S \qquad \text{formula [9]}$$

$$\left.\frac{\partial^2 E(u,v)}{\partial u \partial v}\right|_{(u,v)=(a,b)} = \frac{1}{4}(1, 0, -1, 0, 0, 0, -1, 0, 1)S \qquad \text{formula [10]}$$

These correlation parameters are calculated on each block divided into 18×22 pieces, of which result is stored in the correlation parameter storage memory 107. Herein, the correlation parameters have the following meaning. As the coefficients in formulas 5 to 10 are determined, the squared error of each block in frame t can be expressed as a quadratic function having the shift (u,v) shown in formula 11 as a variable. In formula 11, $E_{ext}$ is expressed as Taylor series of expansion of the squared error of each block at position (a,b). From this function, the correlation is evaluated.

$$E_{ext}(u, v) = \bar{E}(a, b) + (u-a)\frac{\partial E}{\partial u} + (v-b)\frac{\partial E}{\partial v} + \qquad \text{formula [11]}$$
$$\frac{(u-a)^2}{2}\frac{\partial^2 E}{\partial u^2} + (u-a)(v-b)\frac{\partial^2 E}{\partial u \partial v} + \frac{(v-b)^2}{2}\frac{\partial^2 E}{\partial v^2}$$

On the other hand, the definition for smooth change of motion vector between adjoining blocks can be expressed in formula 12. In formula 12, $(\bar{u}, \bar{v})$ is a mean vector determined from a motion vector of adjoining blocks. In the motion vector correcting circuit 108, when a good correlation is expressed (formula 11), the motion vector is estimated by minimizing the linear sum with formula 12 for expressing the smoothness of motion vector between adjoining blocks. The number of evaluations subject to minimization is shown in formula 13, where λ is a non-negative constant determined experimentally. Minimization of formula 13 is aachieved by solving the Euler equation shown in formula 14.

$$E_{int}(u,v)=(u-\bar{u})^2+(v-\bar{u})^2 \qquad \text{formula [12]}$$

$$E_{total}=E_{ext}(u,v)+\lambda E_{int}(u,v) \qquad \text{formula [13]}$$

$$\frac{\partial E_{total}}{\partial (u,v)} = 0 \qquad \text{formula [14]}$$

More specifically, the following calculations are operated in the motion vector correcting circuit 108.

Step 1: In each block, the mean vector $(\bar{u}, \bar{v})$ is determined in formulas 15 and 16, where i and j denote the horizontal and vertical positions of the block subject to calculation as shown in FIG. 10, and primary estimates a, b in the block are used as initial values of $(\hat{u}, \hat{v})$.

$$\bar{u} = \frac{1}{4}(u_{i-1,j} + u_{i,j-1} + u_{i,j+1} + u_{i+1,j}) \quad \text{formula [15]}$$

$$\bar{v} = \frac{1}{4}(v_{i-1,j} + v_{i,j-1} + v_{i,j+1} + v_{i+1,j}) \quad \text{formula [16]}$$

Step 2: In each block, (u, v) are calculated in formulas 17 through 21.

$$t1 = 2\lambda\bar{u} - \left(\frac{\partial E}{\partial u} - \frac{\partial^2 E}{\partial u^2}a - \frac{\partial^2 E}{\partial u \partial v}b\right) \quad \text{formula [17]}$$

$$t2 = 2\lambda\bar{v} - \left(\frac{\partial E}{\partial v} - \frac{\partial^2 E}{\partial u \partial v}a - \frac{\partial^2 E}{\partial v^2}b\right) \quad \text{formula [18]}$$

$$t3 = \frac{\partial^2 E}{\partial u^2}\frac{\partial^2 E}{\partial v^2} - \left(\frac{\partial^2 E}{\partial u \partial v}\right)^2 \quad \text{formula [19]}$$

$$\hat{u} = \frac{\left(2\lambda + \frac{\partial^2 E}{\partial v^2}\right)t1 - \frac{\partial^2 E}{\partial u \partial v}t2}{4\lambda^2 + 2\lambda\left(\frac{\partial^2 E}{\partial u^2} + \frac{\partial^2 E}{\partial v^2}\right) + t3} \quad \text{formula [20]}$$

$$\hat{v} = \frac{\left(2\lambda + \frac{\partial^2 E}{\partial u^2}\right)t2 - \frac{\partial^2 E}{\partial u \partial v}t1}{4\lambda^2 + 2\lambda\left(\frac{\partial^2 E}{\partial u^2} + \frac{\partial^2 E}{\partial v^2}\right) + t3} \quad \text{formula [21]}$$

Finally, the motion vector correcting circuit 108 delivers (û, v̂) into the motion vector output terminal 109. In this embodiment, by correcting the primary estimation (a,b) of the motion vector so as to be close to the motion vector mean of the adjacent block, a spatially smooth motion vector can be obtained. However, different from smoothing of simple motion vector, since formula 13 is minimized, the correction amount is small in the block of a large value of t3 shown in formula 19, that is, in a block having luminance change stable horizontally and vertically, necessary for estimation of motion vector.

In this embodiment, processing from formula 15 to formula 21 is done only once, but not limited to this, by calculating the motion vector mean again by using a corrected motion vector, processing up to formula 21 may be repeated. In this case, it is realized by preparing a plurality of motion vector correcting circuits 108, connecting with the correlation parameter storage memory 107, and connecting in cascade so that the correction value of motion vector may be read as a new primary estimation value.

Figure 2:
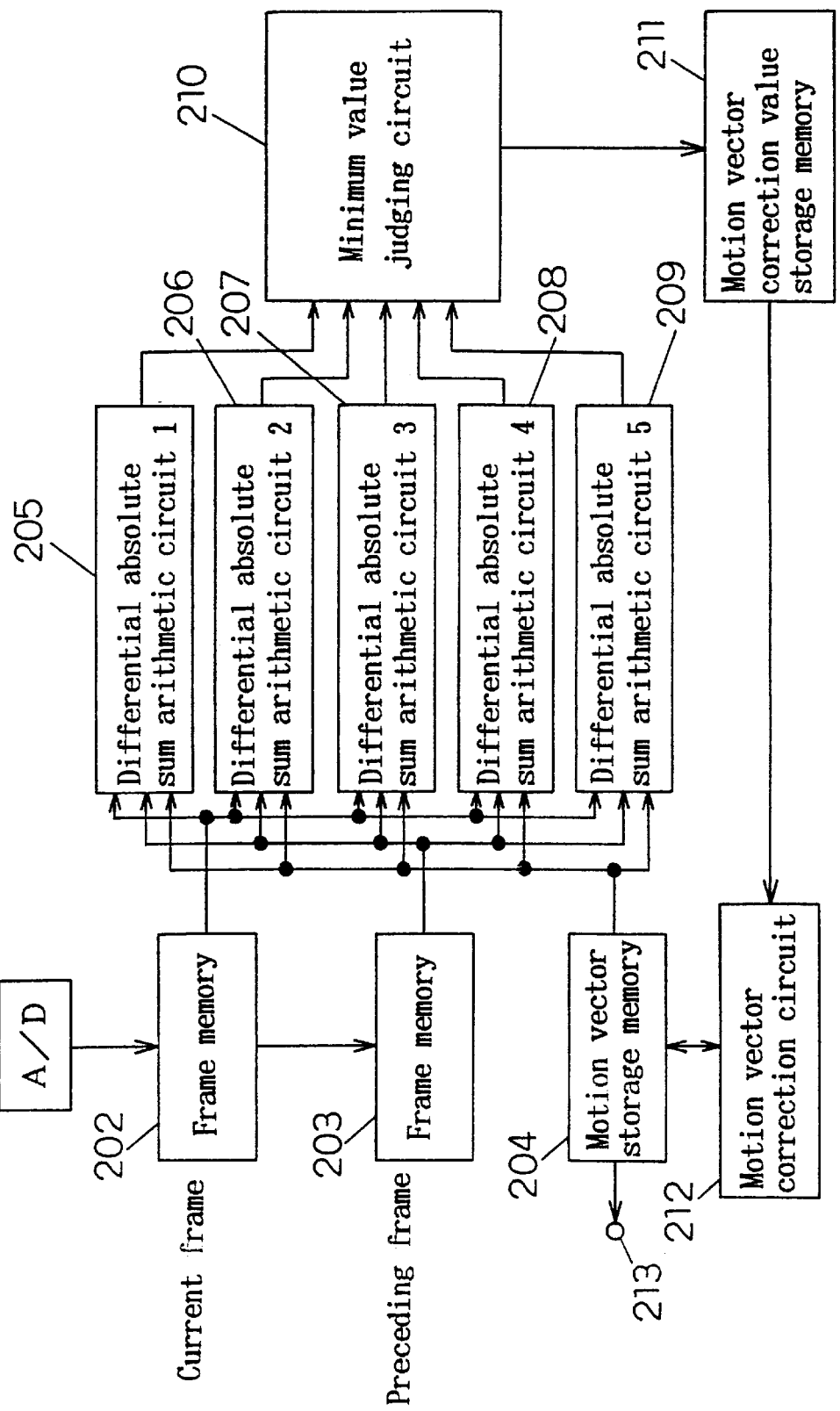
FIG. 2 is a block diagram of a motion vector detector in a second embodiment of the invention.

FIG. 2 is a block diagram of a motion vector detector in a second embodiment of the invention. In FIG. 2, reference numeral 200 is a video input terminal, 201 is an A/D converting circuit for quantizing a video analog signal, 202, 203 are frame memories for storing preceding and succeeding frames of image, 204 is a motion vector storage memory, 205, 206, 207, 208, 209 are differential absolute sum arithmetic circuits (1) to (5), 210 is a minimum value judging circuit, 211 is a motion vector correction value storage memory, 212 is a motion vector correction circuit, and 213 is a motion vector output terminal. The motion vector storage memory 204 composes the shift storage means, the differential absolute sum arithmetic circuits (1) 205 to (5) 209 and minimum value judging circuit 210 compose the minimum shift direction arithmetic means, and the motion vector correction circuit 212 composes correcting means.

Same as the first embodiment, this is a motion vector detector for detecting a parallel move component as motion vector in a block divided into 18×22 pieces.

Referring now to FIGS. 2, 9 and 10, the processing procedure of the motion vector detector of the second embodiment is described below.

Different from the first embodiment, in the second embodiment, the zero vector is used as the initial estimate of motion vector, and the motion vector of each block is corrected and determined by repetition of local correlation calculation.

In this embodiment, the repeating step of this operation is expressed as s, and the estimate motion vector at that moment as (u(s), v(s)). In the motion vector storage memory 204, the motion vector of (u(s), v(s))=(0, 0) in each block at step s=0 is stored. The differential absolute sum arithmetic circuit (1) 205 calculates formula 22, the differential absolute sum arithmetic circuit (2) 206 does formula 23, the differential absolute sum arithmetic circuit (3) 207 does formula 24, the differential absolute sum arithmetic circuit (4) 208 does formula 25, and the differential absolute sum arithmetic circuit (5) 209 does formula 26.

$$E_g(u(s),v(s))=Y(s)d(u(s)-\bar{u}(s),v(s)-\bar{v}(s)) + \Sigma_{(r,y)\in R}|gt-1(\chi+u(s),(y+v(s))-gt(\chi,y)| \quad \text{formula [22]}$$

$$E_g(u(s)-1,v(s))=Y(s)d(u(s)-1-\bar{u}(s), v(s)-\bar{v}(s)) + \Sigma_{r,y)\in R}|gt-1(\chi+u(s)-1,y+v(s))-gt(\chi,y)| \quad \text{formula [23]}$$

$$E_g(u(s)+1,v(s))=Y(s)d(u(s)+1-\bar{u}(s),v(s)-\bar{v}(s)) + \Sigma_{(r,y)\in R}|gt-1(\chi+u(s)+1,y+v(s))-gt(\chi,y)| \quad \text{formula [24]}$$

$$E_g(u(s),v(s)-1)=Y(s)d(u(s)-\bar{u}(s),v(s)-1-\bar{v}(s)) + \Sigma_{r,y)\in R}|gt-1(\chi+u(s),y+v(s)-1)-gt(\chi,y)| \quad \text{formula [25]}$$

$$E_g(u(s),v(s)+1)=Y(s)d(u(s)-\bar{u}(s),v(s)+1-\bar{v}(s)) + \Sigma_{(r,y)\in R}|gt-1(\chi+u(s),y+v(s)+1)-gt(\chi,y)| \quad \text{formula [26]}$$

In formulas 22 to 26, (ū(s), v̄(s)) is the motion vector mean determined in the same procedure as in formulas 15 and 16. Meanwhile, r(s) is expressed in formula 27, where α and β are non-negative constants determined experimentally. Moreover, d(p,q) is a function for evaluating the differential absolute value of the motion vector and adjacent vector mean of the block as shown in formula 28, and Th is a non-negative constant determined experimentally.

$$Y(s)=\alpha+\beta s \quad \text{formula [27]}$$

$$d(p,q) = \begin{cases} |p|+|q| \leftarrow |p|+|q| < Th \\ Th \leftarrow \text{the other case} \end{cases} \quad \text{formula [28]}$$

TABLE 1

| | |
|---|---|
| $E_g(u(s), v(s))$ is minimum | (dx, dy) = (0, 0) |
| $E_g(u(s) - 1, v(s))$ is minimum | (dx, dy) = (-1, 0) |
| $E_g(u(s) + 1, v(s))$ is minimum | (dx, dy) = (1, 0) |
| $E_g(u(s), v(s) - 1)$ is minimum | (dx, dy) = (0, -1) |
| $E_g(u(s), v(s) + 1)$ is minimum | (dx, dy) = (0, 1) |

The minimum value judging circuit 210 writes the correction value of motion vector, by the action shown in Table 1, into the motion vector correction storage memory 211 for each block. The motion vector correction circuit 212 operates, as clear from Table 1 so that the motion vector may be changed to the argument of Eg producing the minimum value among formulas 22 to 26, about the motion vector of each block. This operation is shown in formula 29.

$$(u(s+1), v(s+1)) = (u(s)+dx, v(s)+dy) \quad \text{formula (29)}$$

A newly obtained (u(s+1), v(s+1)) is written into the motion vector storage memory 204. In the differential absolute sum arithmetic circuits (1) 205 to (5) 209, the value of s is increased by 1 and processing from formula 22 to formula 29 is repeated. In this embodiment, this is repeated 30 times. The value of r(s) shown in formula 27 increases as the number of operation steps increases. This is the strategy for estimating the motion vector by regarding with greater importance the luminance differential absolute sum between regions in the initial stage of estimation of motion vector, and thereafter obtaining a spatially smooth motion vector by increasing the effects of motion vector differential absolute term with the neighboring region.

In this embodiment, as compared with the first embodiment, there are some disadvantages, for example, the estimate value of motion vector is in the unit of one pixel (sub pixel unit in the first embodiment), and repeated calculations are necessary, but, to the contrary, a smooth motion vector can be obtained by a simple constitution. Moreover, in this embodiment, an upper limit determined by a specific threshold value Th is provided in the evaluation function output of the motion vector differential absolute value shown in formula 28. Accordingly, in the region with a sufficient luminance change in the block necessary for motion estimation, it is expected to estimate the motion vector more stably even in the border of the region differing largely in motion.

Figure 3:
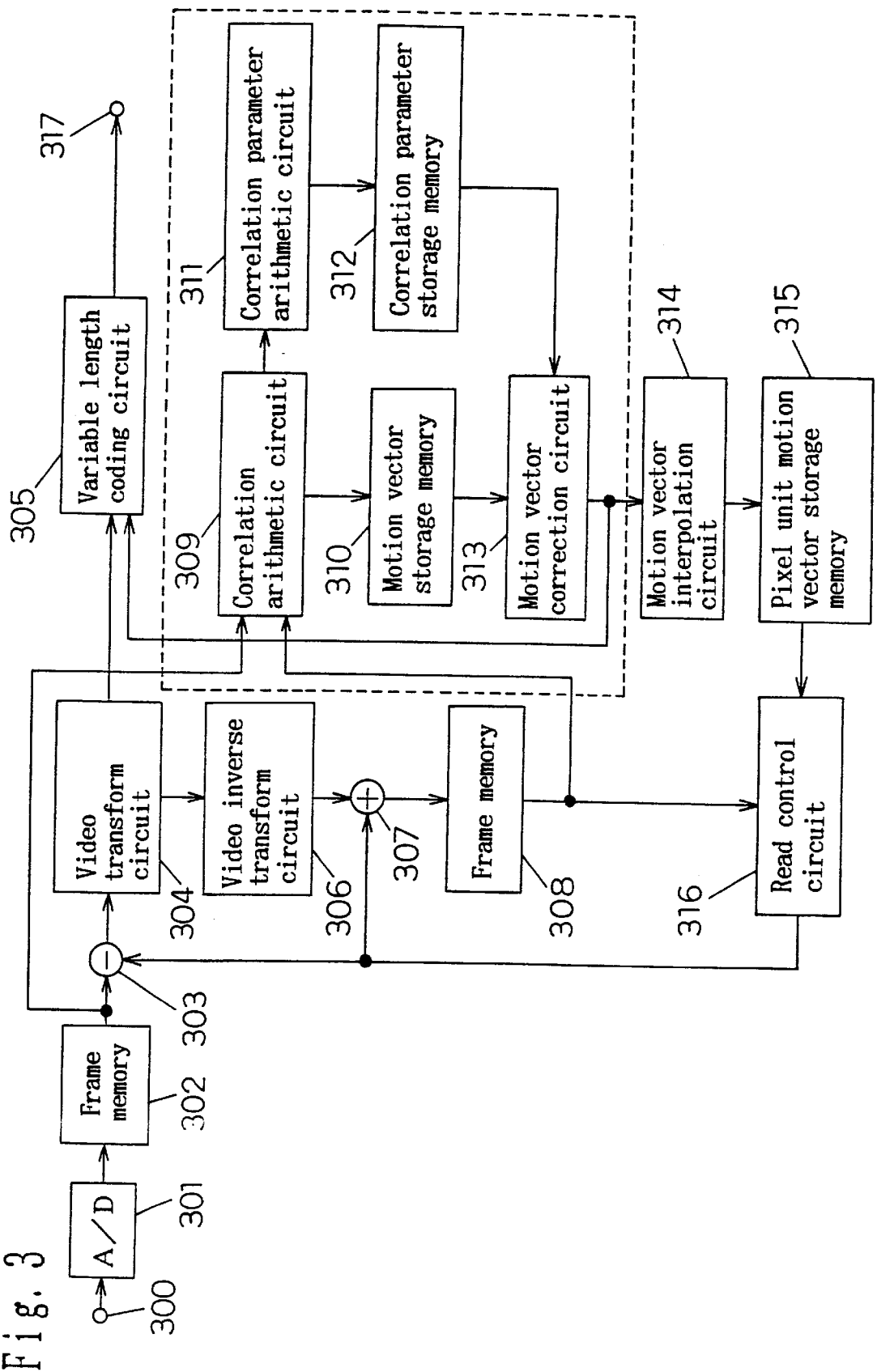
FIG. 3 is a block diagram of a video coder in a third embodiment of the invention.
Figure 4:
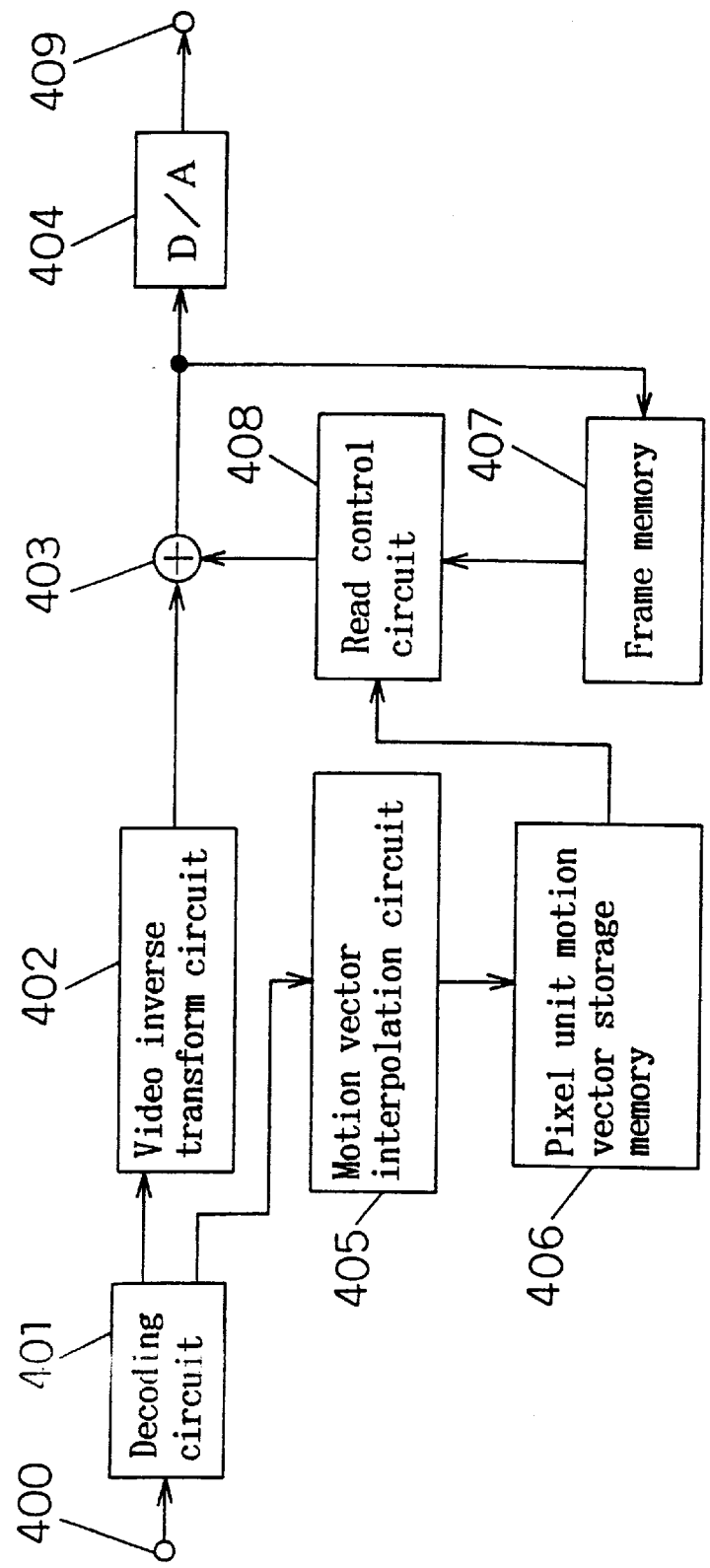
FIG. 4 is a block diagram of a video decoder corresponding to the video coder in the third embodiment.

FIG. 3 is a block diagram of a video coder in a third embodiment of the invention, and FIG. 4 is a block diagram of a video decoder corresponding to the video coder. In FIG. 3 and FIG. 4, reference numeral 300 is a video input terminal, 301 is an A/D converting circuit for quantizing video analog signal 302, 308, 407 are frame memories for storing preceding and succeeding frames of the image, 303 is a differential circuit, 304 is a video converting circuit, 305 is a variable length coding circuit, 306, 402 are video reversing circuits, 307, 403 are adders, 309 is a correlation arithmetic circuit, 310 is a motion vector storage memory, 311 is a correlation parameter arithmetic circuit, 312 is a correlation parameter storage memory, 313 is a motion vector correction circuit, 314, 405 are motion vector interpolating cicuits, 315, 406 are pixel unit motion vector storage memories, 316, 408 are read control circuits, 317 is a video code output terminal, 400 is a video code input terminal, 404 is a D/A converting circuit for converting decoded digital image into an analog video signal, and 409 is a video signal output terminal.

Figure 5:
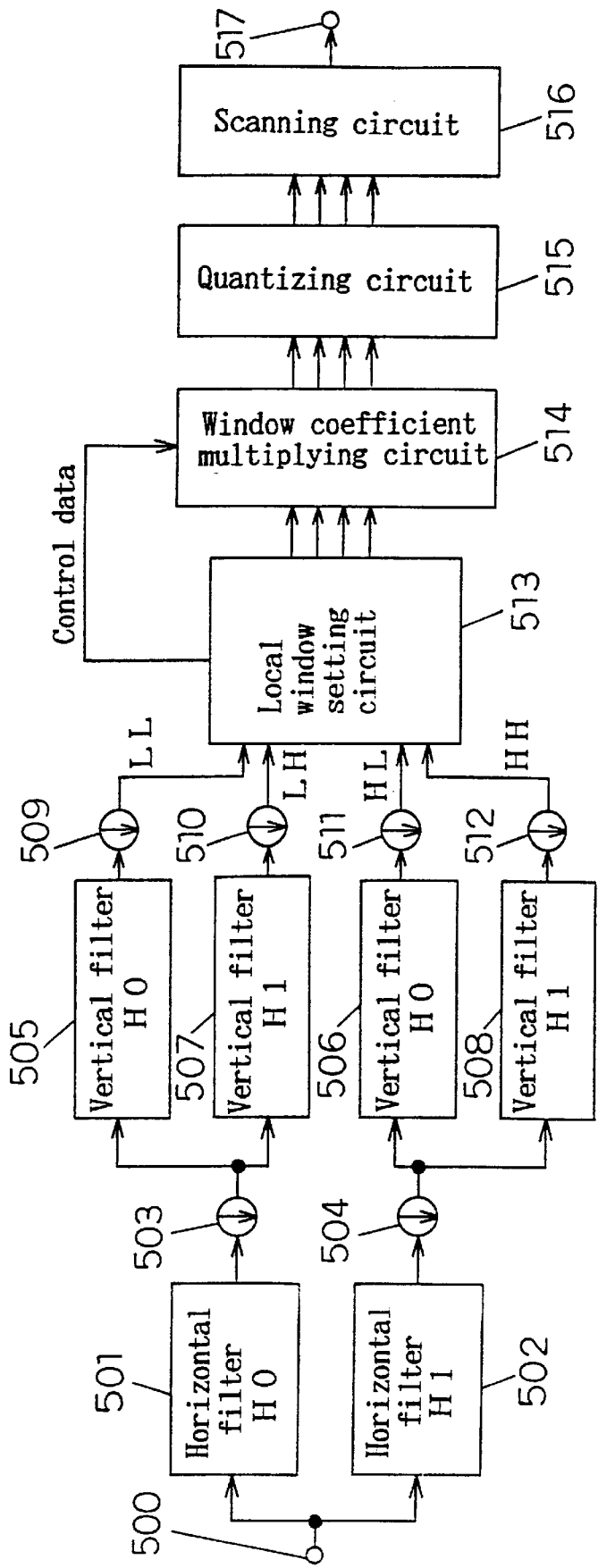
FIG. 5 is a block diagram of a video transform circuit in the third embodiment.
Figure 6:
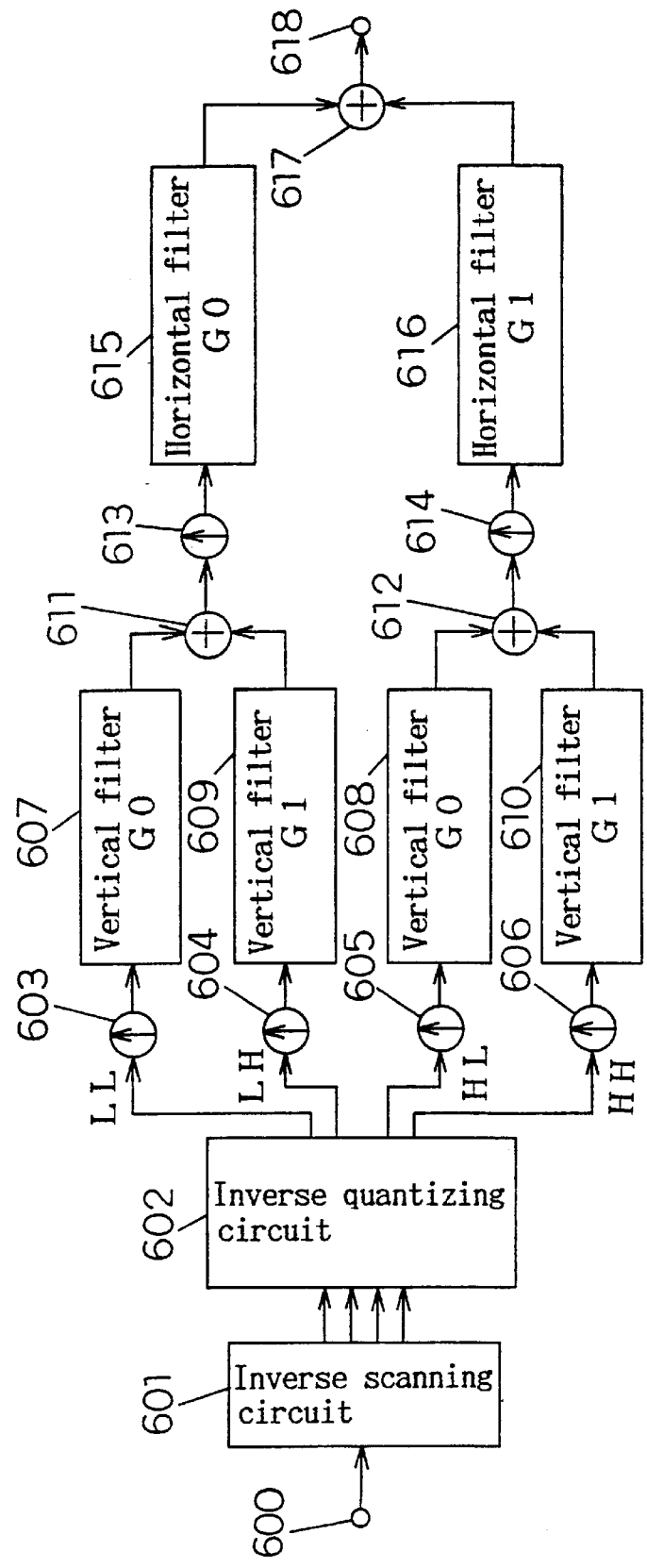
FIG. 6 is a block diagram of a video inverse transform circuit in the third embodiment.

Herein, this embodiment is a video coder corresponding to the herein introduced first video coder, and the herein introduced third and fourth motion vector detectors, and the motion vector interpolating circuit 314 is motion vector interpolating means. The constitution of the video converting circuit 304, and video reversing circuits 306, 402 is shown in FIG. 5 and FIG. 6, respectively. Horizontal filters 501, 502, and vertical filters 505 to 508 in FIG. 5 compose the band dividing means, a local window setting circuit 513 composes changing region detecting means, and window coefficient multiplying means 514 composes window coefficient multiplying means.

Figure 11:
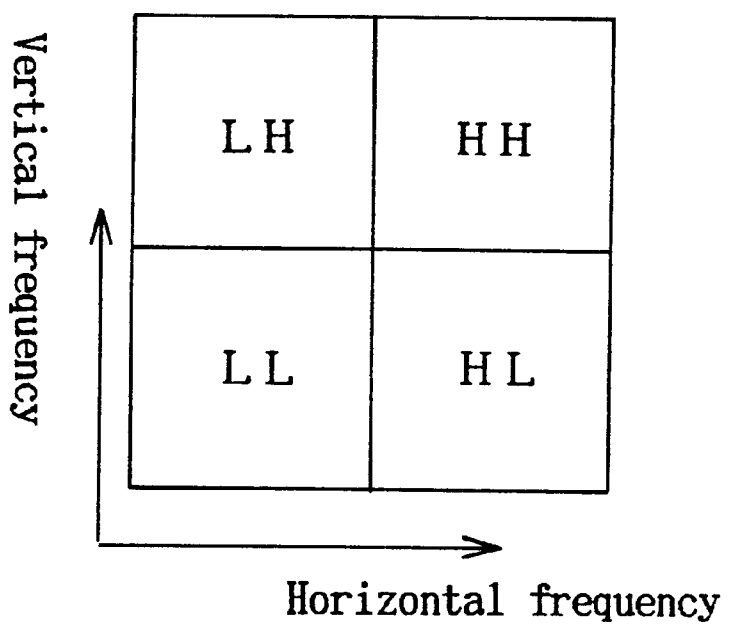
FIG. 11 is a diagram for explaining the sub-band coding band division.
Figure 12:
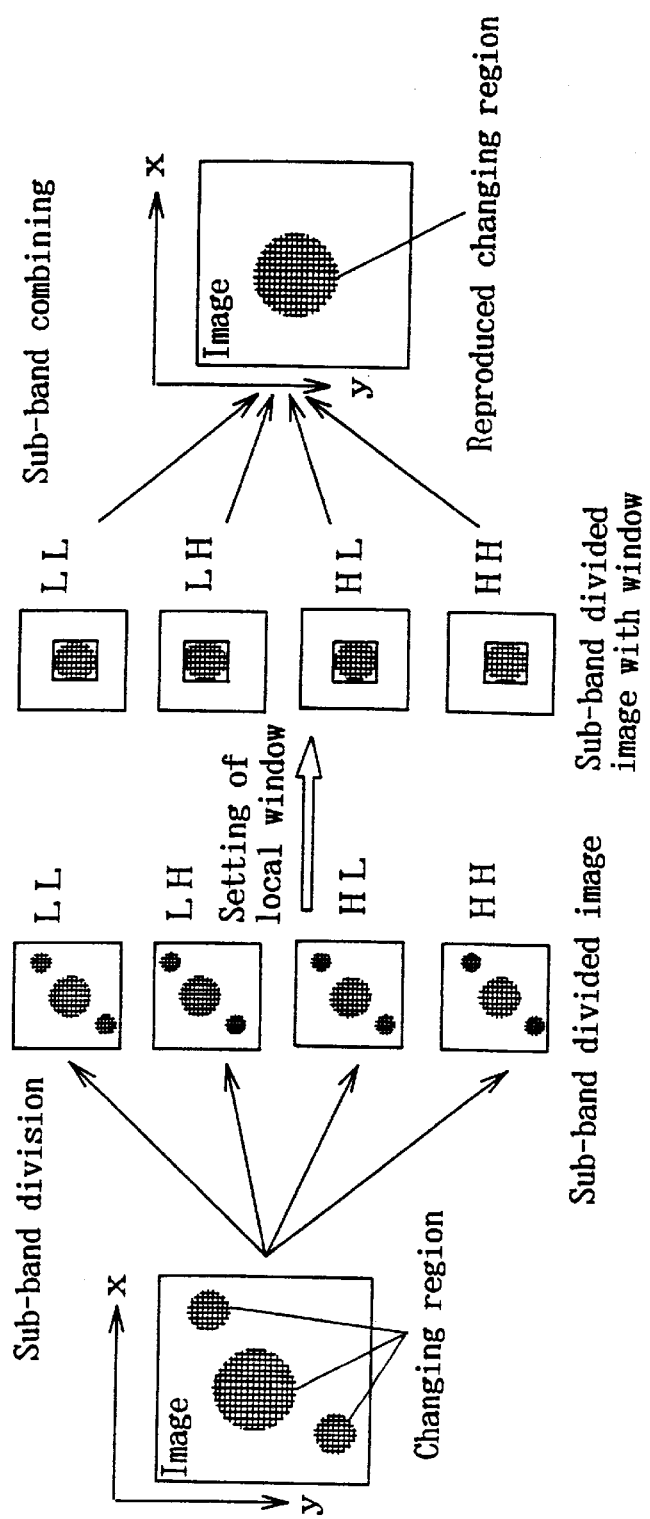
FIG. 12 is a diagram for explaining the sub-band coefficient transmission.

The third embodiment is described below by reference to FIGS. 3, 4, 5, 6, 9, 10, 11, and 12. FIG. 11 is an explanatory diagram of sub-band coding band division, and FIG. 12 is an explanatory diagram of sub-band coefficient transmission.

The third embodiment relates to the motion vector detector and video coder for inter-frame coding by using a motion compensated image. Same as in the first and second embodiments, the input image is composed of 144×176 pixels, and in the block divided into 18×22 pieces shown in the first embodiment, the motion vector detector for detecting its parallel move component as a motion vector is used as a motion detecting unit. The operation of the block from 309 to 313 in the broken line in FIG. 3 is same as the block shown in the first embodiment, and hence the explanation of the operation is omitted. As a result, the motion vector correction circuit 313 generates a spatially smooth motion vector. In this embodiment, by making use of the fact that this motion vector is obtained smoothly, a motion vector in the pixel unit is generated by bilinear interpolation in the motion vector interpolation circuit 314 (405) (for the decoding case, see FIG. 4, same hereinafter). This operation is described by referring to an example in FIG. 10. On the frame t, symbols A, B, C, and D represent central positions of blocks. By contrast, the motion detection shown in the first embodiment, corresponding points to frame t-1 are obtained as A', B', C', and D', and the motion vectors are respectively $(u_A, v_A)$ $(u_B, v_B)$, $(u_C, v_C)$, and $(u_D, v_D)$. At this time, in the motion vector interpolating circuit 314 (405), the operations shown in formulas 30 to 34 are effected at each pixel position of the square region enclosed by A, B, C, D.

$$(u(x), v(x)) = A(x, y)(u_A, v_A) + \quad \text{formula [30]}$$
$$B(x, y)(u_B, v_B) + C(x, y)(u_C, v_C) + D(x, y)(u_D, v_D)$$

$$A(x, y) = \frac{(N-x)(N-y)}{N^2} \quad \text{formula [31]}$$

$$B(x, y) = \frac{x(N-y)}{N^2} \quad \text{formula [32]}$$

$$C(x, y) = \frac{(N-x)y}{N^2} \quad \text{formula [33]}$$

$$D(x, y) = \frac{xy}{N^2} \quad \text{formula [34]}$$

In formula 31, x, y are horizontal and vertical positions having A at the origin, and N is an interval of block centers. In this embodiment, N=8. The motion vector interpolation circuit 314 (405) operates as mentioned above for each pixel in all square regions enclosed by central positions of four adjoining blocks, and writes the result into the pixel unit motion vector storage memory 315 (406). So far is the operation of the third motion vector detector of the invention.

In the reading control circuit 316 (408), a motion compensated image is created by shifting and reading the pixel depending on the motion vector of the pixel. In this embodiment, by the constitution described above, a smooth motion compensated image not causing block boundary can be created in the motion compensated image. In the coder shown in FIG. 3, the output of the reading control circuit 316 is sent into the differential circuit 303, and the differential image with the current frame to be coded is produced. Consequently, coding between motion compensated frames is effected. The differential image is converted into data suited to high efficiency coding in the image converting circuit 304, and is coded, together with the motion vector, in the variable length coding circuit 305.

Herein, the constitution of the image converting circuit 304 and image reversing circuit 306 (402) is explained by reference to FIG. 5 and FIG. 6, respectively. In FIG. 5, reference numeral 500 denotes an input terminal, 501 is a horizontal filter H0, 502 is a horizontal filter H1, 503, 504 are 2:1 down sampling circuits for decimating horizontal pixels by every one pixel, 505, 506 are vertical filters H0, 507, 508 are vertical filters H1, 509, 510, 511, 512 are 2:1 down sampling circuits for decimating vertical pixels by every one pixel, 513 is a local window setting circuit, 514 is a window coefficient multiplying circuit, 515 is a quantizing circuit, 516 is a scanning circuit, and 517 is an output terminal. In FIG. 6, reference numeral 600 denotes an input terminal, 601 is an inverse scanning circuit, 602 is an inverse quantizing circuit, 603, 604, 605, 606 are 1:2 up sampling circuits for inserting a pixel having a zero luminance value in every one pixel in the vertical direction, 607, 608 are vertical filters G0, 609, 610 are vertical filters G1 611, 612, 617 are adders, 613, 614 are 1:2 up sampling circuits for inserting a pixel having a zero luminance value in every one pixel in the horizontal direction, 615 is a horizontal filter G0, 616 is a horizontal filter G1, and 618 is an output terminal.

Described below is the operation of thus constituted image converting circuit 304 and image reversing circuit 306 (402). The constitution of each filter is shown in formulas 35 to 42 in a format of a Z transform, in which $Z_h^{-1}$ and $Z_v^{-1}$ are respectively delay operators of one horizontal pixel and one vertical pixel.

$$\text{Horizontal filter}: H0(Z_h) = \frac{1}{4}(-1 + 3Z_h^{-1} + 3Z_h^{-2} - Z_h^{-3}) \quad \text{formula [35]}$$

$$\text{Horizontal filter}: H1(Z_h) = \frac{1}{4}(1 - 3Z_h^{-1} + 3Z_h^{-2} - Z_h^{-3}) \quad \text{formula [36]}$$

$$\text{Vertical filter}: H0(Z_v) = \frac{1}{4}(-1 + 3Z_v^{-1} + 3Z_v^{-2} - Z_v^{-3}) \quad \text{formula [37]}$$

$$\text{Vertical filter}: H1(Z_v) = \frac{1}{4}(1 - 3Z_v^{-1} + 3Z_v^{-2} - Z_v^{-3}) \quad \text{formula [38]}$$

$$\text{Horizontal filter}: G0(Z_h) = \frac{1}{4}(1 + 3Z_h^{-1} + 3Z_h^{-2} + Z_h^{-3}) \quad \text{formula [39]}$$

$$\text{Horizontal filter}: G1(Z_h) = \frac{1}{4}(1 + 3Z_h^{-1} - 3Z_h^{-2} - Z_h^{-3}) \quad \text{formula [40]}$$

$$\text{Vertical filter}: G0(Z_v) = \frac{1}{4}(1 + 3Z_v^{-1} + 3Z_v^{-2} + Z_v^{-3}) \quad \text{formula [41]}$$

$$\text{Vertical filter}: G1(Z_v) = \frac{1}{4}(1 + 3Z_v^{-1} - 3Z_v^{-2} - Z_v^{-3}) \quad \text{formula [42]}$$

The filter ending with H0 in its name corresponds to a low band pass filter, and the one with H1, to a high band pass filter. In the image converting circuit 304 of the embodiment, in the constitution of filters described above, four images LL, LH, HL, HH are entered in the local window setting circuit 513. The band of each image on two-dimensional spatial frequency is shown in FIG. 11. By sub-band division and down sampling circuit operations, as in the sub-band divided image shown in FIG. 12, the picture size becomes horizontal ½, vertical ½. In the conventional sub-band coding, the constitution is free of a local window setting circuit 315 and a window coefficient multiplying circuit 514. They are supposed to be absent in the following explanation. In the conventional sub-band coding, much information is concentrated in the LL component. In addition, by quantizing the LL image finely and LH, HL, HH coarsely in the quantizing circuit 515, high efficiency coding is effected. Incidentally, the filter coefficient shown in the embodiment is based on the filter disclosed by D. Le Gall, A. Tabatani: "Sub-band Coding of Digital Images Using Symmetric Short Kernel Filters and Arithmetic Coding Techniques," Proc. IEEE Int. Conf. Acoustic Speech Signal Processing, pp. 761–764, April 1988, and in the absence of quantizing error, the image is completely reconstructed through sub-band dividing and sub-band synthesizing. On the other hand, at a very low bit rate, in order to suppress the coding amount, it is necessary to quantize the LL image coarsely considerably in the quantizing circuit 515. Accordingly, it gives rise to the problem mentioned as (C4) as one of the problems to be solved in the invention.

Accordingly, instead of completely quantizing the interframe difference from the motion compensated image, it is considered to send only a certain collected mass of a local region.

In the image shown in FIG. 12, a motion changing region is formed at three positions. In this embodiment, when coding such image, instead of transmitting all differential image components by coarse quantizing, the strategy is to transmit only a region of high energy among differential images by such quantizing as not to cause ringing. This is explained in FIG. 5. In FIG. 5, by the operation of the local window setting circuit 513 according to formulas 43 and 44, the aim is to search the central position (1, m) of a square region of which one side is 2T-1 so that the sum of energies of all frequency components may be maximum.

$$(l, m) = \quad \text{formula [43]}$$
$$\arg\max_{l,m} \sum_{(x,y)} w(x, y; l, m)((f_{LL}(x, y)^2 + f_{LH}(x, y)^2 + f_{HL}(x, y)^2 + f_{HH}(x, y)^2))$$

$$w(x, y; l, m) = \begin{cases} 1 \leftarrow |x - l| < T \text{ and } |y - m| < T \\ 0 \leftarrow \text{the other case} \end{cases} \quad \text{formula [44]}$$

In formula 43, $f_{LL}$, $f_{LH}$, $f_{HL}$, $f_{HH}$ express the luminance of each frequency component image, called sub-band coefficient. In this embodiment, it is supposed T=18. The size of one side of window is 35, and the number of vertical pixels of each image divided into sub-band is 72, and one side of window is equivalent to the size of about half the number of vertical pixels.

The window coefficient multiplying circuit 514 reads in the search result (1, m) from the local window setting circuit 513. By the calculation of formulas 45 and 46, the sub-band coefficients $f_{LL}$, $f_{LH}$, $f_{HL}$, $f_{HH}$ are converted into $f'_{LL}$, $f'_{LH}$, $f'_{HL}$, $f'_{HH}$. This is because the sub-band coefficient is finally zero except for the region of the large energy sum of differential image as shown in FIG. 12. Incidentally, the function shown in formula 46 realizes Hamming window, which is because ringing may be formed near the window boundary if the sub-band coefficient is cut off by the square window.

$$\begin{aligned} f'_{LL}(x, y) &= h(x, y; l, m)w(x, y; l, m)f_{LL}(x, y), \quad \text{formula [45]}\\ f'_{LH}(x, y) &= h(x, y; l, m)w(x, y; l, m)f_{LH}(x, y),\\ f'_{HL}(x, y) &= h(x, y; l, m)w(x, y; l, m)f_{HL}(x, y),\\ f'_{HH}(x, y) &= h(x, y; l, m)w(x, y; l, m)f_{HH}(x, y) \end{aligned}$$

$$h(x, y; l, m) = \quad \text{formula [46]}$$
$$\left(0.54 + 0.46\cos\left(\frac{\pi(x-l)}{T}\right)\right)\left(0.54 + 0.46\cos\left(\pi\frac{(y-m)}{T}\right)\right)$$

Incidentally, formula 46 may be changed to a Gaussian window or a Blackman window depending on the application.

In the quantizing circuit 515, by quantizing the sub-band coefficient other than the window region, the result is issued to the scanning circuit 516. In the scanning circuit 516, the sub-band coefficients are reshuffled in the sequence of $f_{LL}$, $f_{LH}$, $f_{HL}$, $f_{HH}$ and sent out to the output terminal 517.

The inverse scanning circuit 601 and inverse quantizing circuit 602 in FIG. 6 perform inverse processing of quantizing and scanning mentioned above. After the process of quantizing and inverse quantizing, the sub-band coefficients as the inputs to the up sampling circuits 603 to 606 contain quantizing errors. In this embodiment, since all sub-band coefficients other than the window region are zero, the quantizing error in the window region can be suppressed smaller as compared with the case of sending sub-band coefficients of a full screen.

Although the differential information of the full screen is not coded, in this embodiment, since the motion compensation method in a pixel unit not causing block boundary in the motion compensated image is employed, notable visual deterioration does not occur. In particular, supposing this invention is applied to a visual telephone, the background picture is transmitted by motion compensation, while the facial expression change is transmitted by a sub-band coefficient in window region, so that very low bit rate coding of high picture quality can be expected as compared with the prior art.

Figure 15:
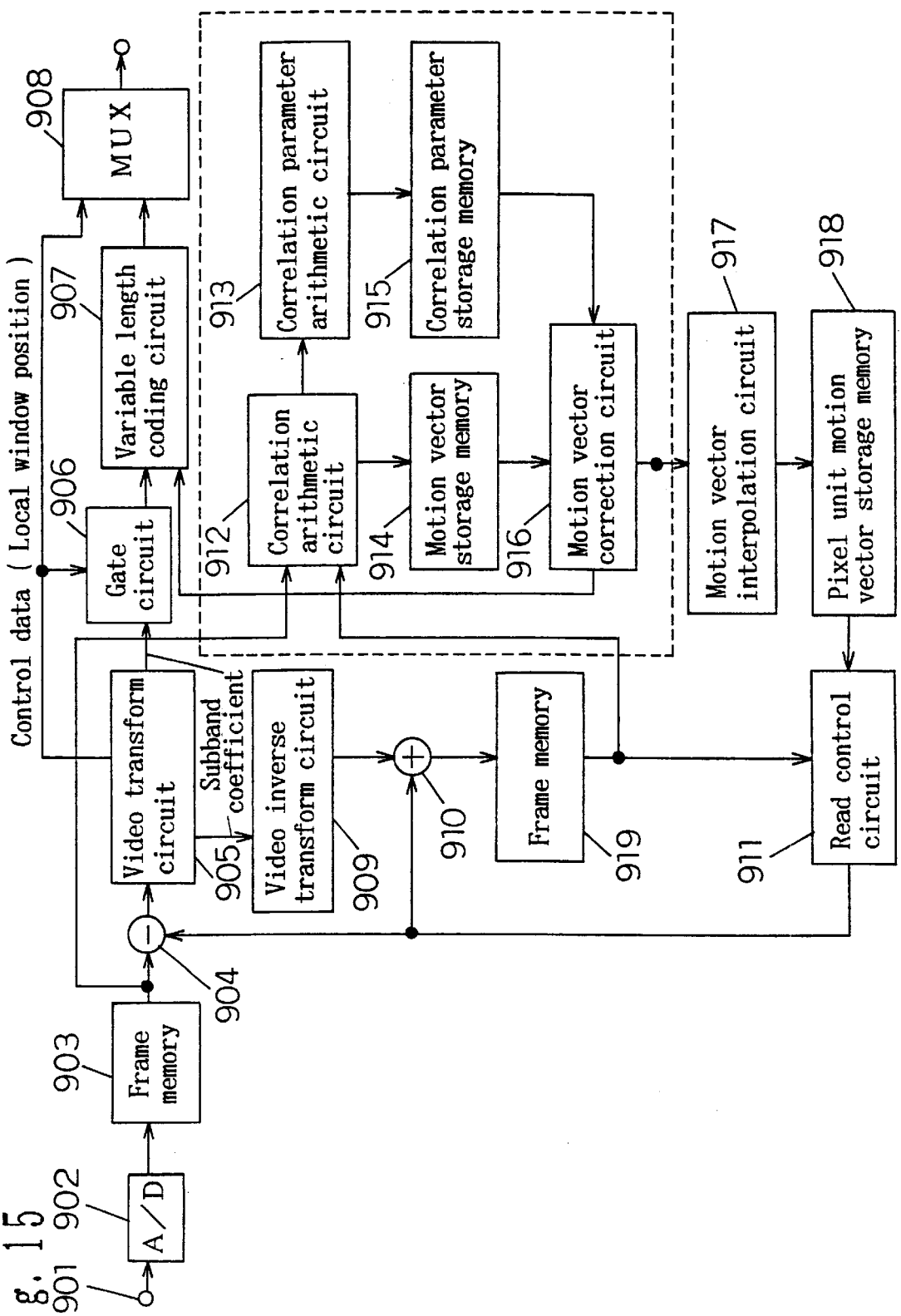
FIG. 15 is a block diagram of a video coder in a sixth embodiment of the invention.
Figure 16:
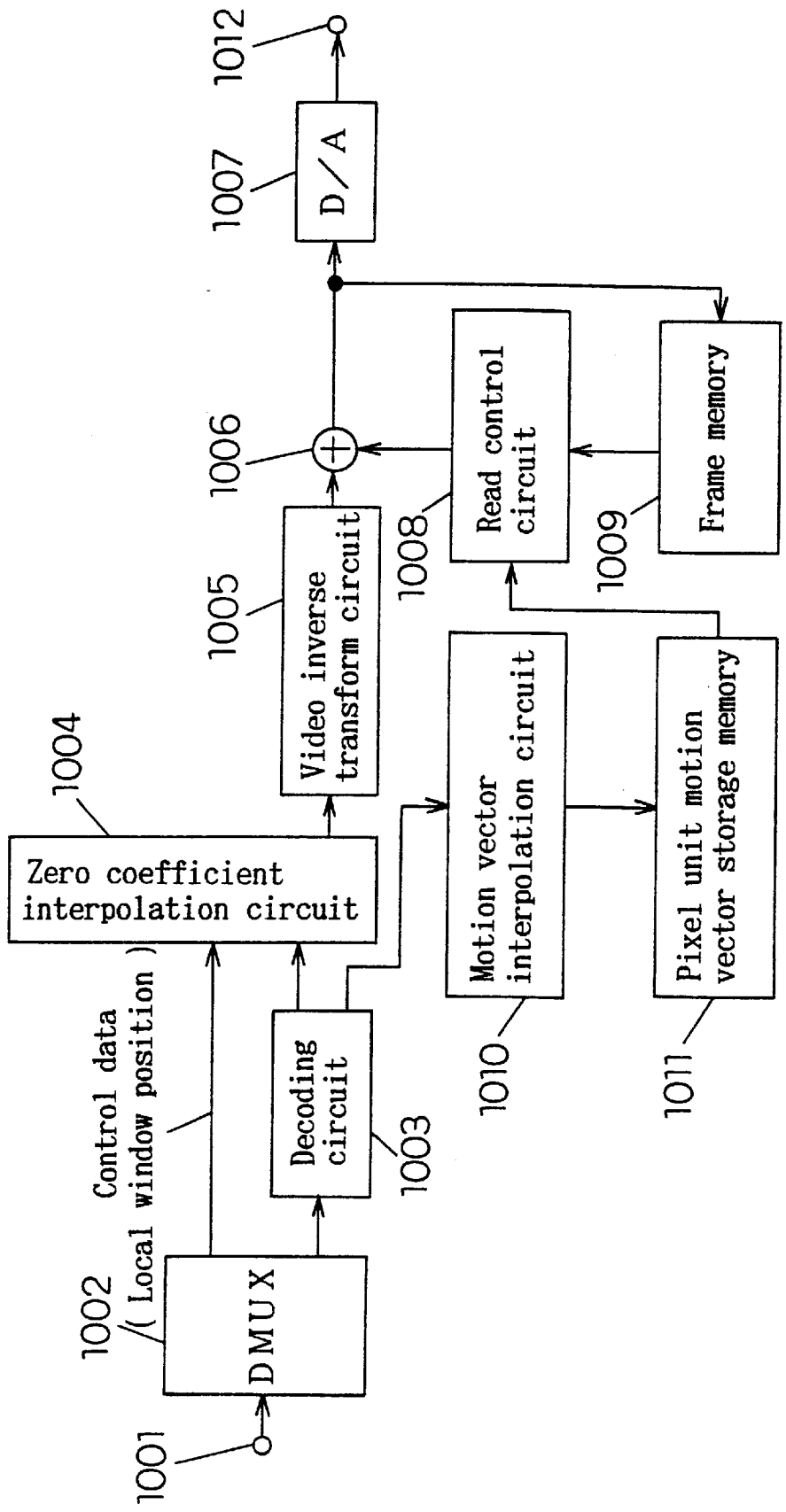
FIG. 16 is a block diagram of a video decoder corresponding to the video coder in the sixth embodiment.

As an improvement of the embodiment, it may be considered to develop a video coder which does not transmit sub-band coefficient becoming zero, except in the local window, by comprising, instead of the window coefficient multiplying circuit 514, region information coding means for coding and transmitting the window position data delivered from the local window setting circuit 513, and band component coding means for transmitting only the window band component in the window region shown by the window position data. It corresponds to the second video coder set forth hereinbefore. In this case, there is a new requirement to determine the transmission format of window position information between the video coder and video decoder, but it is expected that coding amount may be further decreased. That is FIG. 15 is corredponding to the present embodiment and FIG. 16 is corresponding to the video coder of FIG. 15. The present embodiment is similar to the third embodiment of FIG. 3 and FIG. 4. The different point is as described above that the video in the third embodiment though the sub-band coefficient of not-significant image region is made zero by multiplying the sub-band coefficient by widow function, the sub-band coefficient of zero is transmitted. However in the present invention the position of a window is transmitted as control data by multiplexer 908, so that the zero coefficient does not need to be transmitted and then the transmission of zero sub-band coefficient is suppressed by a gate circuit 906. In FIG. 16 the de-multiplexer 1002 separates the control data(window position) in response to the FIG. 15. The zero coefficient interpolating circuit 1004 interpolates zero coefficient to sub-band coefficient in window outputted from the decoding circuit 1003, thereby to output the sub-band coefficient to image reversing circuit 1005. The other means and operation is the same as those of the embodiment of FIG. 3, and FIG. 4.

Figure 7:
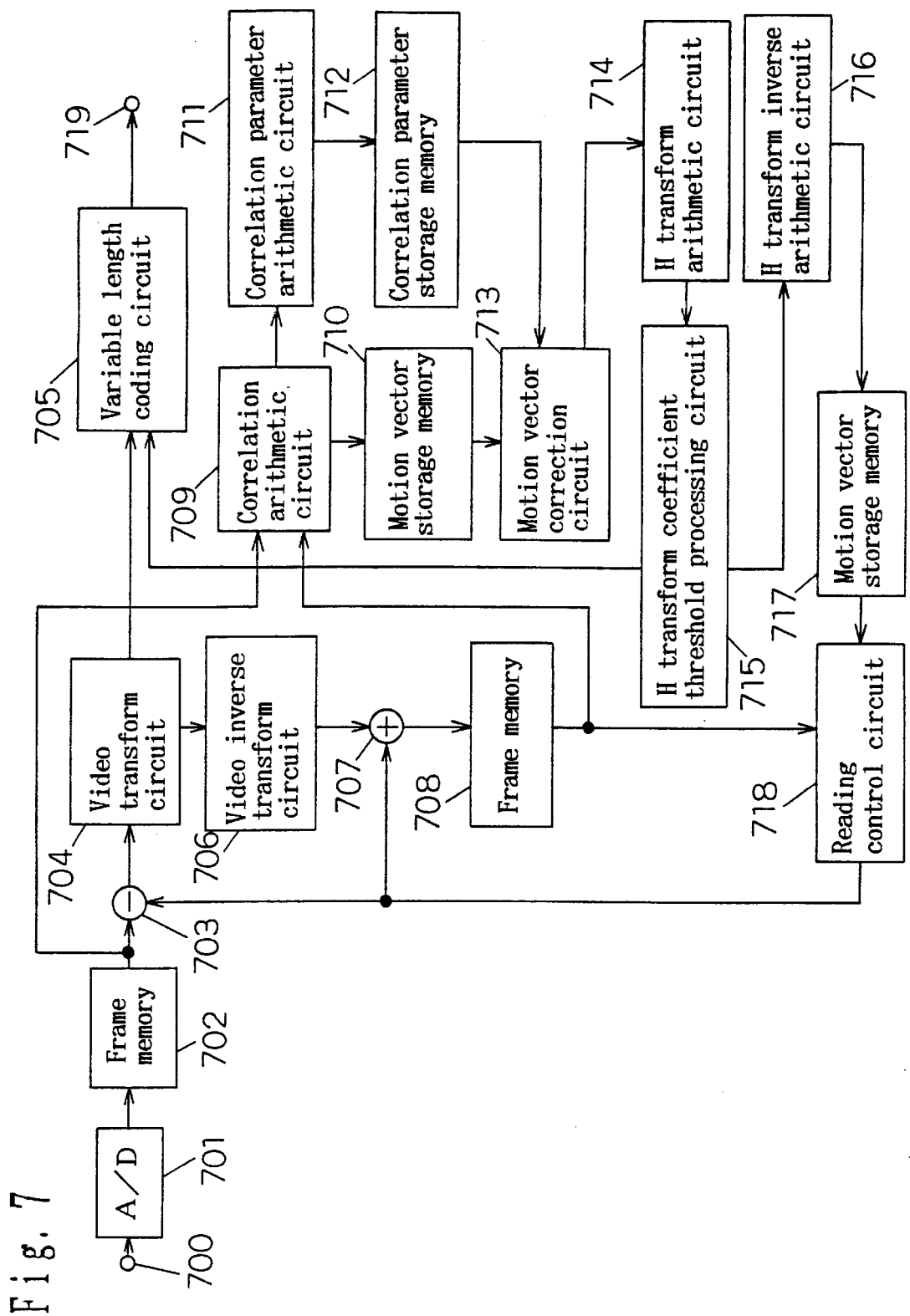
FIG. 7 is a block diagram of a video coder in a fourth embodiment of the invention.
Figure 8:
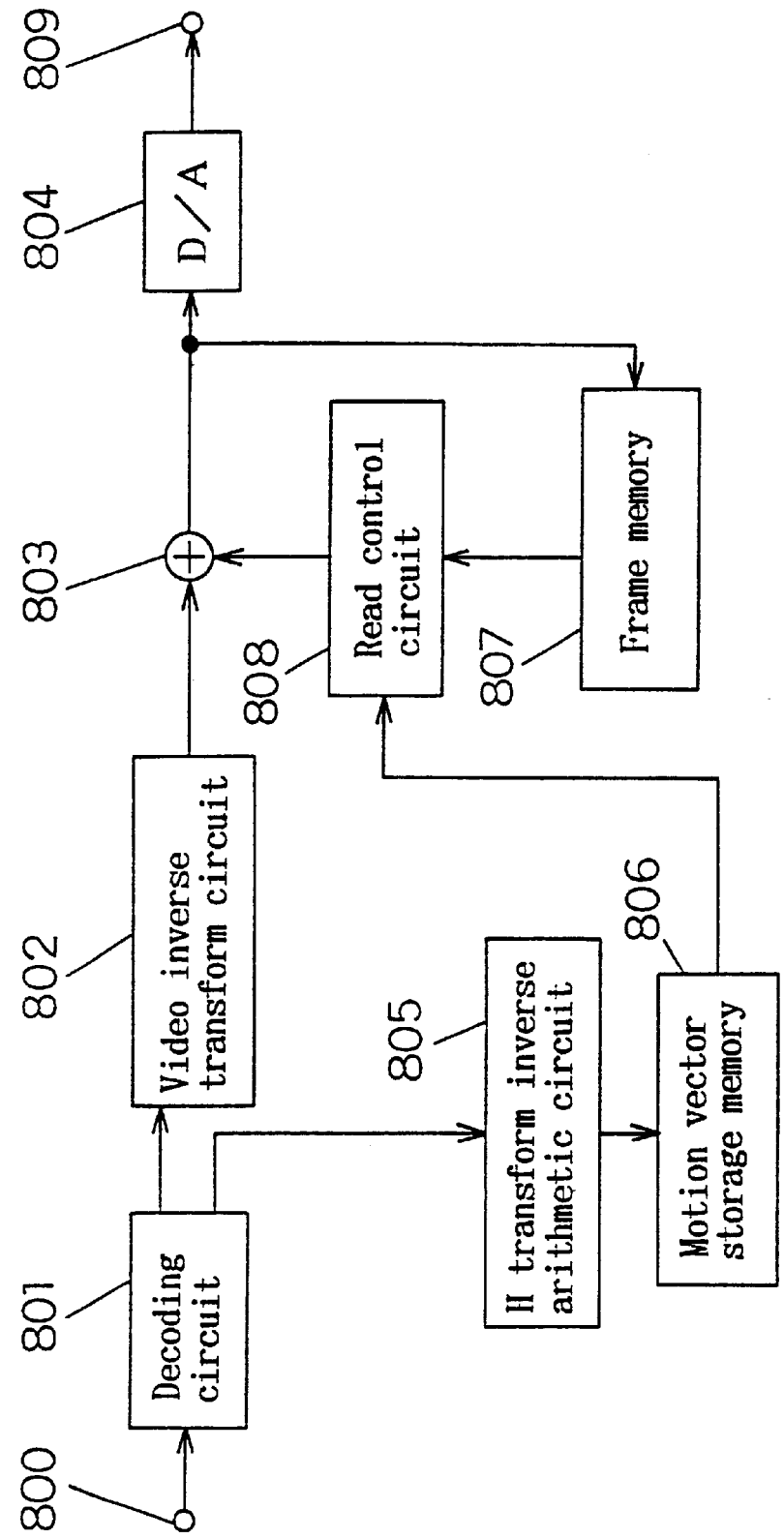
FIG. 8 is a block diagram of a video decoder corresponding to the video coder in the fourth embodiment.

FIG. 7 is a block diagram of a video decoder in a fourth embodiment of the invention, and FIG. 8 is a block diagram of a video decoder corresponding to this video coder and corresponding to claim 9.

In FIG. 7 and FIG. 8, reference numeral 700 is a video input terminal, 701 is an A/D converting circuit for quantizing a video analog signal, 702, 708, 807 are frame memories for storing preceding and succeeding frames of image, 703 is a differential circuit, 704 is a video transform circuit, 705 is a variable length coding circuit, 706, 802 are image inverting circuits, 707, 803 are adders, 709 is a correlation arithmetic circuit, 710 is a motion vector storage memory, 711 is a correlation parameter arithmetic circuit, 712 is a correlation parameter storage memory, 713 is a motion vector correction circuit, 714 is an Hadamard transform arithmetic circuit, 715 is an Hadamard transform coefficient threshold processing circuit, 716, 805 are Hadamard transform inverse arithmetic circuits, 717, 806 are motion vector storage memories, 718, 808 are read control circuits, 719 is a video code output terminal, 800 is a video code input terminal, 801 is a decoding circuit, 804 is a D/A converting circuit for converting the decoded digital image into an analog video signal, and 809 is a video signal output terminal.

Herein, the embodiment corresponds to the hereinbefore introduced second video coder of the invention, in which the Hadamard transform arithmetic circuit 714 and others compose motion vector converting means, and the variable length coding circuit 705 composes motion vector coding means.

Figure 13:
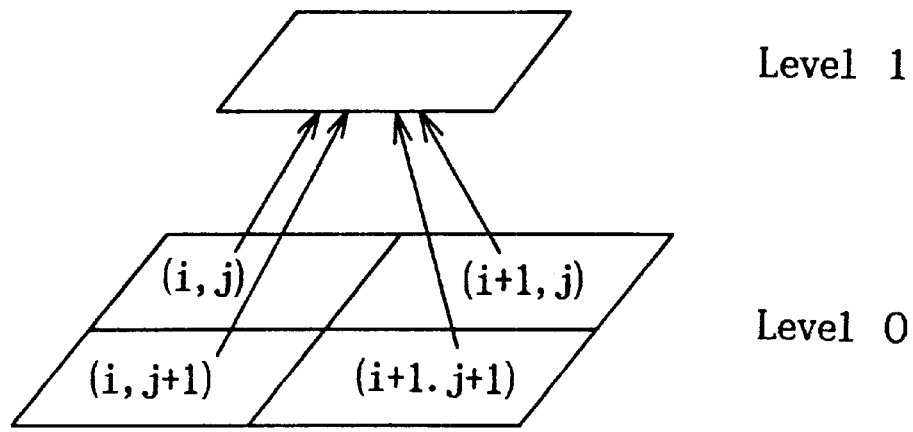
FIG. 13 is a block diagram of a video coder in a fifth embodiment of the present invention.
Figure 14:
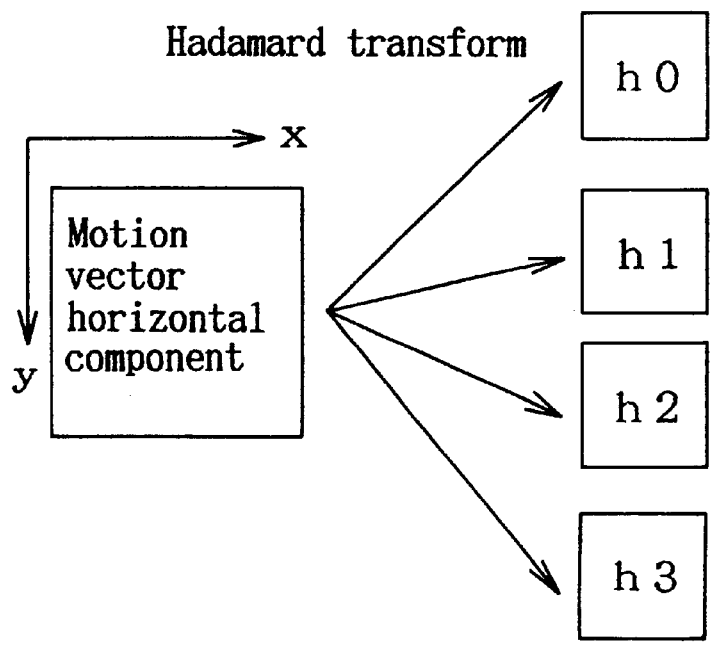
FIG. 14 is a diagram for explaining the motion vector orthogonal transform processing.

The fourth embodiment is described below while referring to FIGS. 7, 8, 13, and 14. FIG. 13 is an explanatory diagram of motion vector layer coding, and FIG. 14 is an explanatory diagram of orthogonal transform processing of motion vector.

The fourth embodiment relates to, same as the third embodiment, a video coder for inter-frame coding using the motion compensated image. What differs between the third embodiment and fourth embodiment is only the difference in constitution for generation of motion compensated image and motion vector coding, and more specifically, in the coding apparatus, the different point is that the motion vector interpolation circuit 314 is replaced by the Hadamard transform arithmetic circuit 714, Hadamard transform coefficient threshold processing circuit 715, and Hadamard transform inverse arithmetic circuit 716. Correspondingly, in the video decoder, the motion vector interpolation circuit 405 is replaced by the Hadamard transform inverse arithmetic circuit 805. For this replacement, the specification of the motion vector storage memories 717, 806, reading control circuits 718, 808, variable length coding circuit 705, and decoding circuit 801 is slightly different, but the processing of each block except for the replaced portions is basically the same as in the third embodiment, and hence detailed description is omitted.

The processing of the replaced portions is described below. In this embodiment, in the motion vector smoothly obtained by the motion vector correction circuit 713, in the Hadamard transform arithmetic circuit 714, four blocks performing motion vector detection are handled as one block, and transformed orthogonally as shown in FIG. 13. This operation is shown in formulas 47 through 51.

$$U_{i,j} = (u_{i,j}, u_{i,j+1}, u_{i+1,j}, u_{i+1,j+1})^t \qquad \text{formula [47]}$$

$$h0_{i,j} = \frac{1}{2}(1, 1, 1, 1)U_{i,j} \qquad \text{formula [48]}$$

$$h1_{i,j} = \frac{1}{2}(1, -1, 1, -1)U_{i,j} \qquad \text{formula [49]}$$

$$h2_{i,j} = \frac{1}{2}(1, 1, -1, -1)U_{i,j} \qquad \text{formula [50]}$$

-continued $$h3_{i,j} = \frac{1}{2}(1, -1, -1, 1)U_{i,j} \qquad \text{formula [51]}$$

Accordingly, the motion vector horizontal components in 18×22 blocks are decomposed into four components of h0,h1, h2, h3 of 9×11 as shown in FIG. 14. In formulas 47 to 51, only the horizontal component u of motion vector is shown, but v is also Hadamard transformed by the same processing.

When motions of four blocks subject to Hadamard transform are all equal, coefficients h1, h2, h3 other than h0 are all zero. In this embodiment, in particular, the motion information is concentrated on coefficient h0 in order to obtain the motion vector smoothly. The series by shuffling the transform coefficients h0, h1, h2, h3 sequentially after Hadamard transform is coded at high efficiency by variable length coding using Hafman coding. This is conducted in the variable length coding circuit 705. In this embodiment, prior to this coding, coefficients h1, h2, and h3 of which absolute value is less than 1 are transformed to 0 by the Hadamard transform coefficient threshold circuit 715, or are directly issued if 1 or more. Expressing the threshold processed transform coefficient in formula 52, the Hadamard transform inverse arithmetic circuit 716 processes as expressed in formulas 53 through 56.

$$H_{i,j} = (h0_{i,j}, h1'_{i,j+1}, h2'_{i+1,j}, h3'_{i+1,j+1})^t \qquad \text{formula [52]}$$

$$u'_{i,j} = \frac{1}{2}(1, 1, 1, 1)H_{i,j} \qquad \text{formula [53]}$$

$$u'_{i,j+1} = \frac{1}{2}(1, -1, 1, -1)H_{i,j} \qquad \text{formula [54]}$$

$$u'_{i+1,j} = \frac{1}{2}(1, 1, -1, -1)H_{i,j} \qquad \text{formula [55]}$$

$$u'_{i+1,j+1} = \frac{1}{2}(1, -1, -1, 1)H_{i,j} \qquad \text{formula [56]}$$

The effect of Hadamard transform and threshold processing is explained in an example in which formula 47 is $U_{i,j}=(1,3,2,3)^t$. In this case, the result of Hadamard transform is ($h0_{i,j}=9/2$, $h0_{i,j}=-3/2$, $h0_{i,j}=-1/2$, $h0_{i,j}=-1/2$). By inversely transforming this value without threshold processing, $U_{i,j}$ is completely restored. In this embodiment, the transform coefficient is changed by threshold processing to $H_{i,j}=(9/2,-3/2,0,0)$. The motion vector horizontal component obtained by this inverse transform is (3/2,3,3/2,3). That is, $u_{i,j}$ and $u_{i+1,j}$ are changed to the value expressing the average of the two.

In this embodiment, the information is concentrated on the coefficient h0 by Hadamard transform, the zero component of Hadamard transform coefficient is increased by threshold processing, so that the motion vector can be coded by a smaller coding amount. In particular, the effect is great because the motion vector is obtained smoothly. Although the motion vector is not reorganized completely by threshold processing, since the threshold processing is done on the coefficients h1, h2, h3, the reorganizing result of motion vector is a smoothed value, which does not cause notable visual deterioration. Moreover, the greater differential information than the threshold is stored, and therefore the block boundary with a largely different motion can be reorganized completely even after Hadamard transform and its inverse transform.

The reason of using Hadamard transform in this embodiment is that the original motion vector is completely reorganized by fixed decimal point operation by a simple circuit constitution, but the Hadamard transform of slant transform may be replaced by orthogonal transform.

Since the picture handled in this embodiment is small, the coefficient of 9×11 was determined by Hadamard transform, but in a larger picture, it may be considered to code the motion vector in layers by subjecting the obtained coefficient h0 further to Hadamard transform.

As described herein, the invention brings about the following effects.

By using the first or second motion vector detector, a smooth motion vector can be obtained by making use of the correlation of the neighboring blocks. As a result, if the region used in block correlation is smaller in size, the motion vector can be obtained relatively stably.

In the third or fourth motion vector detector the motion vector in the pixel unit can be generated by utilizing the first or second motion vector detector. This is effective not to form a block boundary in the motion compensated picture.

In the first video coder, by concentrating the coding amount only in the region where the inter-frame differential electric power is concentrated, ringing caused by very low bit rate sub-band coding can be reduced.

In the second video coder, by concentrating the coding amount only in the region where the inter-frame differential electric power is concentrated, ringing caused by very low bit rate sub-band coding can be reduced, and further it is necessary to transmit the position information of the region where the inter-frame differential electric power is concentrated to the decoder, but an advantage is that it is not necessary to transmit the sub-band coefficient which becomes zero in other regions.

In the third video coder, by transforming and coding the motion vector, the coding amount of the motion vector can be suppressed low. In particular, in very low bit rate coding, the effect of saving of motion vector coding amount is great.

What is claimed is:

1. A video coder comprising:

a prediction error image generating means for generating an image from a reference frame by using frame correlation, a band dividing means for dividing an image into plural frequency band components, a changing region detecting means for detecting a region within each frequency band component of the image that has a luminance change larger than a certain amount, a region information coding means for transmitting position information of the region detected by the changing region detecting means, and a band component coding means for transmitting only the region detected by the changing region detecting means for each frequency band component of the image divided by the band dividing means, whereby image information only in the region with a large luminance change is transmitted.

2. A video decoder capable of decoding position information related to a transmitted partial region from a video coder that includes a prediction error image generating means for generating an image from a reference frame by using frame correlation, a band dividing means for dividing an image into plural frequency band components, a changing region detecting means for detecting a region within each frequency band component of the image that has a luminance change larger than a certain amount, a region information coding means for transmitting position information of the region detected by the changing region detecting means, and a band component coding means for transmitting only the region detected by the changing region detecting means for each frequency band component of the image divided by the band dividing means such that image information only in the region with a large luminance change is transmitted by the video coder, said decoder comprising:

a band combining means for combining frequency band components to obtain the original image by multiplying the region of each frequency band component based on the position information by a non-zero window coefficient and an area outside the region of each frequency band component based on the position information by a zero window coefficient, a region information decoding means for decoding position information of a transmitted partial region from said video coder, thereby to decode only the partial region defined by the position information.

\* \* \* \* \*